(12) United States Patent
Moore

(10) Patent No.: US 12,156,489 B2
(45) Date of Patent: Dec. 3, 2024

(54) SPREADER VEHICLE CONFIGURATION

(71) Applicant: EXMARK MANUFACTURING COMPANY INCORPORATED, Beatrice, NE (US)

(72) Inventor: Jeffrey J. Moore, Beatrice, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 443 days.

(21) Appl. No.: 17/694,491

(22) Filed: Mar. 14, 2022

(65) Prior Publication Data

US 2023/0284553 A1   Sep. 14, 2023

(51) Int. Cl.
| | |
|---|---|
| *A01C 17/00* | (2006.01) |
| *A01C 23/00* | (2006.01) |
| *B60K 5/00* | (2006.01) |
| *B60P 1/00* | (2006.01) |
| *B62D 51/02* | (2006.01) |

(52) U.S. Cl.
CPC ............. *A01C 17/001* (2013.01); *B60K 5/00* (2013.01); *B60P 1/00* (2013.01); *B62D 51/02* (2013.01); *A01C 23/006* (2013.01)

(58) Field of Classification Search
CPC ...... A01C 17/001; A01C 23/006; B60K 5/00; B60P 1/00; B62D 51/02
See application file for complete search history.

(56) References Cited

U.S. PATENT DOCUMENTS

| | | | | |
|---|---|---|---|---|
| 6,862,872 | B2 * | 3/2005 | Wright .................. | A01D 34/82 56/14.7 |
| 8,887,841 | B2 * | 11/2014 | Oswald .................. | A01D 34/82 180/6.48 |
| 10,005,437 | B2 * | 6/2018 | Slegelis ................. | A01D 34/64 |
| 10,729,073 | B2 * | 8/2020 | Bryant .................. | A01D 34/82 |
| 10,952,378 | B2 * | 3/2021 | Bryant .................. | A01D 34/64 |
| 11,864,492 | B2 * | 1/2024 | Moore ................... | A01D 34/86 |
| 2021/0195834 | A1 * | 7/2021 | Arendt ................ | G05D 1/0236 |
| 2022/0111894 | A1 * | 4/2022 | Cook ...................... | B62D 9/00 |
| 2022/0314862 | A1 * | 10/2022 | Moore ................... | B62D 51/02 |
| 2023/0284553 | A1 * | 9/2023 | Moore ................... | B62D 51/02 |
| 2023/0292732 | A1 * | 9/2023 | Moore ............... | A01M 9/0092 239/146 |

\* cited by examiner

*Primary Examiner* — Jacob B Meyer

(74) *Attorney, Agent, or Firm* — Mueting Raasch Group

(57) ABSTRACT

A vehicle has a vehicle frame having a first end and a second end and a first siderail and a second siderail spaced laterally and each extend longitudinally from the first end to the second end. A caster wheel having a lateral axis is rotatably coupled to the vehicle frame towards the first end. Drive wheels defining an axis are rotatably coupled to the vehicle frame towards the second end. A prime mover coupled to the vehicle frame has a base and a vertical driveshaft, which is in operative communication with the drive wheels, extending from the base. The vertical driveshaft has a driveshaft axis closer to the second siderail than the first siderail laterally and closer to the caster wheel axis than the drive wheel axis longitudinally. The base is positioned vertically below most of the length of each of the first siderail and the second siderail.

27 Claims, 4 Drawing Sheets

SPREADER VEHICLE CONFIGURATION

TECHNOLOGICAL FIELD

The present technology generally relates to a spreader vehicle. More particularly, the present technology relates to configurations of spreader vehicle.

SUMMARY

Some embodiments of the technology disclosed herein relate to a maintenance vehicle. The vehicle has a vehicle frame having a first end and a second end. The vehicle frame has a first siderail and a second siderail spaced laterally from the first siderail. The first siderail and the second siderail each extend longitudinally from the first end to the second end. A caster wheel is rotatably coupled to the vehicle frame towards the first end, and the caster wheel defines a caster wheel axis extending in a lateral direction. Drive wheels are rotatably coupled to the vehicle frame towards the second end, and the drive wheels define a drive wheel axis. A prime mover is coupled to the vehicle frame. The prime mover has a base and a vertical driveshaft extending from the base. The vertical driveshaft is in operative communication with the drive wheels. The vertical driveshaft has a driveshaft axis closer to the second siderail than the first siderail in the lateral direction. The driveshaft axis is closer to the caster wheel axis than the drive wheel axis in the longitudinal direction. The base is positioned vertically below most of the length of each of the first siderail and the second siderail.

In some such embodiments, the prime mover is an internal combustion engine. Additionally or alternatively, the base of the prime mover is positioned vertically below a plane defined by a top end of the caster wheel. Additionally or alternatively, the vehicle has a standing platform coupled to the vehicle frame towards the second end, where the standing platform adapted to support a standing operator. Additionally or alternatively, most of the standing platform is positioned vertically below the drive wheel axis. Additionally or alternatively, the standing platform is positioned beyond the drive wheel axis in the longitudinal direction. Additionally or alternatively, the vehicle has a hopper assembly having a hopper coupled to the vehicle frame towards the first end. Additionally or alternatively, the hopper assembly is pivotably coupled to the vehicle frame about a hopper pivot axis between a maintenance position and an operating position. Additionally or alternatively, the hopper pivot axis extends across the first end of the maintenance vehicle. Additionally or alternatively, the hopper pivot axis is positioned beyond the caster wheel on the first end. Additionally or alternatively, the hopper assembly is configured to pivot in a forward direction relative to the maintenance vehicle.

Some embodiments of the technology disclosed herein relate to a maintenance vehicle having a vehicle frame having a first end and a second end. The vehicle frame has a first siderail and a second siderail spaced laterally from the first siderail. The first siderail and second siderail each extend longitudinally from the first end to the second end. A mounting structure is fixed to the first siderail and the second siderail. The mounting structure has a mounting surface positioned laterally between and vertically below most of the length of each of the first and second siderails. The mounting surface is positioned longitudinally between the first end and second end, and the mounting surface defines a driveshaft opening that is positioned closer to the second siderail than the first siderail in a lateral direction. Drive wheels are rotatably coupled to the vehicle frame towards the second end, where the drive wheels define a drive wheel axis extending in the lateral direction. A prime mover is mounted to the mounting structure. The prime mover has a base in contact with the mounting surface and a vertical driveshaft extending through the driveshaft opening. The vertical driveshaft is in operative communication with the drive wheels and has a driveshaft axis. A standing platform is coupled to the vehicle frame towards the second end, which is adapted to support a standing operator. The standing platform is positioned beyond the drive wheel axis in the longitudinal direction.

In some such embodiments, most of the standing platform is positioned vertically below the drive wheel axis. Additionally or alternatively, a caster wheel is rotatably coupled to the vehicle frame towards the first end, where the caster wheel defines a caster wheel axis. Additionally or alternatively, the driveshaft axis is closer to the caster wheel axis than the drive wheel axis in the longitudinal direction. Additionally or alternatively, the drive wheel axis is positioned between the mounting surface and most of the standing platform in both the vertical and longitudinal directions. Additionally or alternatively, the prime mover is an internal combustion engine.

Additionally or alternatively, the vehicle has a hopper assembly having a hopper coupled to the vehicle frame towards the first end. Additionally or alternatively, the hopper assembly is pivotably coupled to the vehicle frame, where the hopper assembly is pivotable about a hopper pivot axis between a maintenance position and an operating position. Additionally or alternatively, the vehicle has a hopper assembly having a hopper pivotably coupled to the vehicle frame towards the first end, where the hopper assembly is pivotable about a hopper pivot axis extending across the first end of the maintenance vehicle. The hopper pivot axis is positioned beyond the caster wheel on the first end.

Some embodiments of the technology disclosed herein relate to a maintenance vehicle having a vehicle frame having a first end and a second end. The vehicle frame has a first siderail and a second siderail spaced laterally from the first siderail. A caster wheel is rotatably coupled to the vehicle frame towards the first end, where the caster wheel defines a caster wheel axis extending in a lateral direction. Drive wheels are rotatably coupled to the vehicle frame towards the second end, the drive wheels defining a drive wheel axis. A standing platform is coupled to the vehicle frame towards the second end, the standing platform adapted to support a standing operator. A prime mover is coupled to the vehicle frame, the prime mover having a vertical driveshaft having a driveshaft axis and a base positioned vertically below a plane defined by a top end of the caster wheel. The drive wheel axis is positioned between the base and the standing platform in both a vertical direction and a longitudinal direction. The vertical driveshaft axis is closer to the caster wheel axis than the drive wheel axis in the longitudinal direction.

In some such embodiments, most of the platform is positioned vertically below the drive wheel axis. Additionally or alternatively, the prime mover is an internal combustion engine. Additionally or alternatively, a hopper assembly has a hopper coupled to the vehicle frame towards the first end. Additionally or alternatively, the hopper assembly is pivotably coupled to the vehicle frame, where the hopper assembly is pivotable about a hopper pivot axis between a maintenance position and an operating position. Additionally or alternatively, the hopper pivot axis extends across the first end of the maintenance vehicle, and wherein the hopper pivot axis is positioned beyond the caster wheel on the first end. Additionally or alternatively, the base is positioned vertically below most of the length of each of the first siderail and the second siderail.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
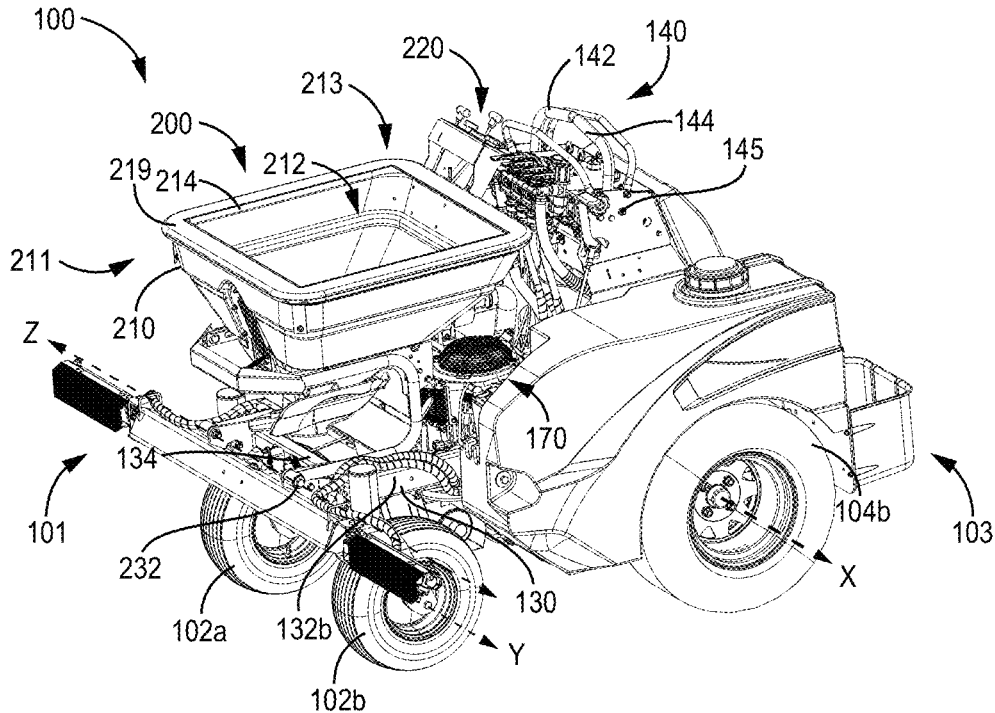
FIG. 1 is a first perspective view of an example implementation of the technology disclosed herein in a maintenance vehicle.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

Figure 3:
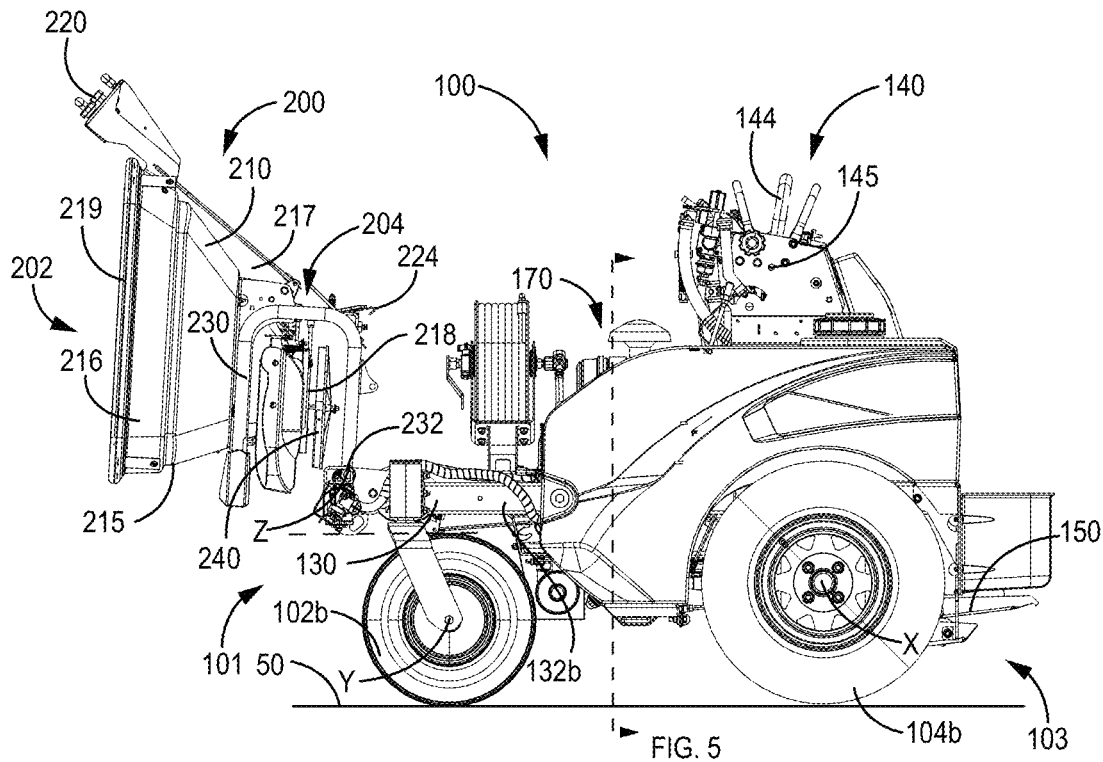
FIG. 3 is a side view of an example vehicle consistent with FIG. 1.

It is noted that the terms "have," "include," "comprise," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle 100 is in an operating configuration (e.g., while the vehicle 100 is positioned such that wheels 102 and 104 rest upon a generally horizontal ground surface 50 as shown in FIG. 3). These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
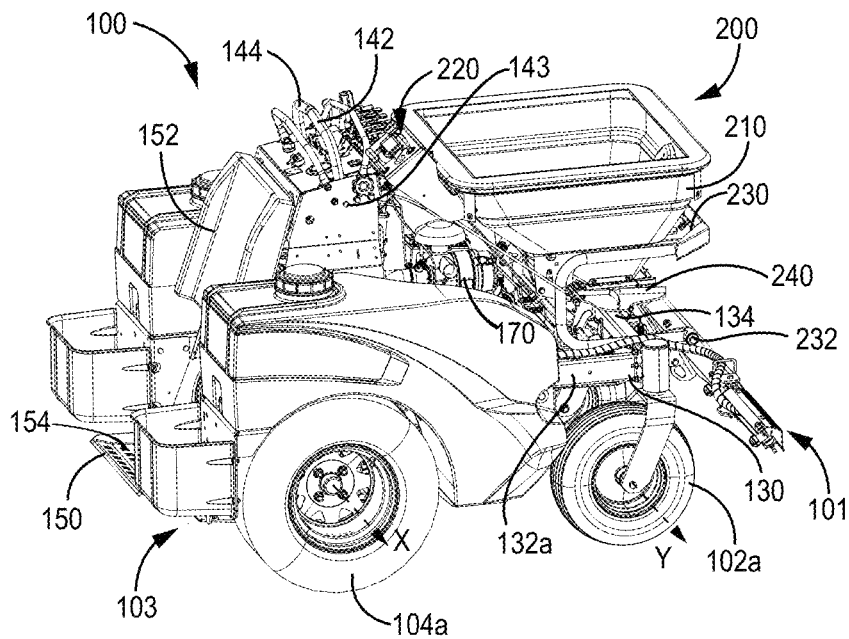
FIG. 2 is a second perspective view of an example vehicle consistent with FIG. 1.

The current disclosure is generally directed to a maintenance vehicle 100. In some implementations the maintenance vehicle 100 has a spreader vehicle, such as a sprayer-spreader vehicle, which is the example implementation described herein. The maintenance vehicle 100 can have a variety of implementations consistent with the current disclosure. FIGS. 1-3 are consistent with some example implementations of a maintenance vehicle that is a riding vehicle. FIGS. 1 and 2 are alternate perspective views of the example maintenance vehicle 100, and FIG. 3 is a side view of the example maintenance vehicle 100. The maintenance vehicle 100 is generally configured to be propelled along a ground surface 50 (denoted in FIG. 3) and spread granular or liquid material across the ground surface 50.

The maintenance vehicle 100 generally has a frame 130 (of which a portion is visible) that is configured to support various vehicle components. The frame 130 has a first end 101, which can be a front end, and a second end 103, which can be a rear end. The frame 130 has a plurality of load bearing members such as first siderail 132a (FIG. 2) and second siderail 132b (FIGS. 1 and 3). A "siderail" is defined as a structural, load-bearing component of the vehicle frame 130. A siderail is generally an elongate beam. In some embodiments, siderails are constructed of fabricated sheet metal such as press-formed or roll-formed sheet metal. Siderails can be formed from extruded metal or cast metal in other examples. In some embodiments siderails are each a hollow beam such as structural tubing or a pipe. In some other embodiments the siderails are each a solid beam. In some embodiments the siderail can define at least one channel extending along the length of the siderail, such as an I-beam, H-beam, T-beam, U-beam, or beams having alternate shapes.

The first siderail 132a and the second siderail 132b generally extend longitudinally between the first end 101 and the second end 103 of the frame 130. In some embodiments the first siderail 132a and the second siderail 132b each extend longitudinally from the first end 101 to the second end 103 of the frame 130. The first siderail 132a and the second siderail 132b are generally spaced apart in a lateral direction. In various embodiments, the first siderail 132a and the second siderail 132b are parallel, but in other embodiments the first siderail 132a and the second siderail 132b are non-parallel. The frame 130 has one or more crossbeams 136 that are each fixed to the first siderail 132a and the second siderail 132b. For example, a first crossbeam 134 extends in the lateral direction across the first end 101 of the vehicle 100, which has a first end 133 fixed to the first siderail 132a and a second end 135 fixed to the second siderail 132b (best visible in FIG. 4, which is a simplified perspective view of the vehicle 100, which is discussed in more detail below). Additional crossbeams can also be coupled to the first siderail 132a and the second siderail 132b, although such crossbeams are not currently visible.

The frame 130 is generally configured to be propelled across the ground surface 50 (FIG. 3). In particular, ground engaging members 104 and 102 are rotatably coupled to the vehicle frame 130. Here the ground engaging members are drive wheels 104 and one or more caster wheels 102, but in some embodiments the ground engaging members can be tracks, rollers, and/or other types of wheels. The one or more caster wheels 102 are rotatably coupled to the vehicle frame 130 towards the first end 101 of the vehicle frame 130. The one or more caster wheels 102 are generally undriven wheels that are configured to accommodate directional motion of the maintenance vehicle 100 initiated and directed by the drive wheels 104. The one or more caster wheels 102 are generally freely swivelable about a vertical swivel axis relative to the vehicle frame 130. Each caster wheel 102 has a caster wheel axis Y, which the particular caster wheel 102 rotates around when the caster wheel is oriented in the longitudinal direction (such as shown in FIGS. 1-3), which is in a forward orientation. In some embodiments, including the specific example depicted, the caster wheels 102 mutually define the caster wheel axis Y, such that the caster wheel axis Y is a shared axis that the caster wheels 102 rotate around when oriented in the longitudinal direction. It is possible that, in some embodiments, the caster wheels 102 have separate caster wheel axes when the caster wheels 102 are oriented in the longitudinal direction. In such embodiments, the separate caster wheel axes can be parallel.

The drive wheels 104 are rotatably coupled to the vehicle frame towards the second end 103 of the vehicle frame 130. The drive wheels 104 are generally configured to propel the vehicle 100 over the ground surface 50 and control the vehicle's direction. The drive wheels 104 are generally in communication with a prime mover 170 (e.g., internal combustion engine or electric motor(s)) that is configured to selectively propel the drive wheels 104 to propel the vehicle 100 across the ground. A left and a right ground engaging drive wheel 104 are rotatably coupled to left and right sides of a rear portion of the vehicle 100, respectively. The drive wheels 104 may be independently powered by the prime mover 170 (e.g., via one or more hydraulic motors, transmissions, or the equivalent) so that they may be driven independently of one another. This permits spin or skid type turning in a zero radius turn manner by rotating one drive wheel 104 in a forward direction while simultaneously rotating the other drive wheel 104 in a reverse direction.

The drive wheels 104 are rotatable about a drive wheel axis X that extends in the lateral direction. In some embodiments, the drive wheel axis X is parallel to the caster wheel axis Y. Although the illustrated vehicle 100 has the drive wheels 104 in the rear, this configuration is not limiting. For example, other embodiments may reverse the location of the wheels, e.g., drive wheels in front and the caster wheel(s) in back. Moreover, other configurations may use different wheel configurations altogether, e.g., a tri-wheel configuration or a conventional front-wheel-steering configuration. Accordingly, other embodiments are possible without departing from the scope of the invention.

The prime mover 170 is coupled to the vehicle frame 130. The prime mover 170 is generally configured to drive the drive wheels 104, which will be described in more detail below. The prime mover 170 can be an internal combustion engine in some embodiments. In some other embodiments the prime mover 170 is an electric motor. In various embodiments, the prime mover 170 has a driveshaft (not currently visible) that is vertically oriented (i.e., a "vertical driveshaft"). The driveshaft is generally in operative communication with the drive wheels 104.

The prime mover 170 is generally configured to be controlled by a user through a control panel 140, for example. The control panel 140 is in operative communication with the prime mover 170. The control panel 140 can have one or more handles 142, 144 that are configured to selectively propel and direct vehicle propulsion. In some embodiments a first handle 142 and a second handle 144 extend outward from the vehicle frame 130 and are each configured to be manually translated relative to the vehicle frame 130 to control operation of the vehicle 100. In the example depicted, the first handle 142 and the second handle 144 are each manually pivotable about a pivot. The first handle 142 has a first pivot 143 (best visible in FIG. 2) and the second handle 144 has a second pivot 145 (visible in FIG. 3). The first handle 142 and the second handle 144 are manually translated about their respective pivots 143, 145 to control operation of the vehicle 100.

In some embodiments, the first handle 142 and second handle 144 can be considered a twin lever control panel, where translation of each handle 142, 144 controls the speed and rotational direction of a corresponding drive wheel 104(a), 104(b). In this example, translation of the first handle 142 controls a first drive wheel 104(a) and translation of the second handle 144 controls a second drive wheel 104(b). A drive wheel is considered to "correspond" to a particular handle when it is located on the same side of the vehicle, such that a drive wheel on the right side of the vehicle corresponds to a handle on the right side of the vehicle.

The vehicle 100 can have handles with other configurations as well. In some embodiments, a handle can be configured as a steering wheel. The vehicle 100 can have various alternative and additional controls that can be used by the operator to manipulate function of the vehicle 100. The one or more handles 142, 144 and/or various other controls of the control panel 140 are configured to be accessible to the operator positioned on the vehicle 100.

In the current example, the vehicle 100 is configured as a stand-on vehicle. As such, a standing platform 150 (FIGS. 2-3) is coupled to the vehicle frame 130. The standing platform 150 is one or more surface(s) adapted to support the feet of a standing operator. The standing platform 150 is coupled to the vehicle frame 130 towards the second end 103. A support pad 152 (FIG. 2) can be coupled to the vehicle 100 that is configured to support the body of standing operator positioned on the standing platform 150. In some embodiments, the standing platform 150 is pivotably mounted on the vehicle 100. In such embodiments the standing platform 150 has a deployed position where a platform surface 154 (FIG. 2) extends longitudinally outwardly from the vehicle to receive a standing operator. The standing platform 150 can also have a stored position where the platform surface 154 is pivoted upward or downward in a position that is not configured to receive a standing operator. In alternative embodiments, the vehicle can be a riding vehicle or a walk-behind vehicle. In some other embodiments, the vehicle has a seat to accommodate a seated operator instead of a standing operator. In embodiments where the vehicle has a seat instead of a standing platform, the one or more handles 142, 144 and other system controls are configured to be accessible to the seated operator.

In various embodiments including the one depicted, the maintenance vehicle 100 has a hopper assembly 200 coupled to the vehicle frame 130. The hopper assembly 200 is coupled to the vehicle frame 130 towards the first end 101 of the vehicle frame 130. The hopper assembly 200 has a hopper 210 that is generally configured to store material for transport across a ground surface 50 via the maintenance vehicle 100. In some embodiments, the hopper assembly 200 is configured to distribute bulk material across a ground surface 50, such as where the hopper assembly 200 is a component of a spreader device. In such embodiments, the maintenance vehicle 100 is considered a spreader vehicle.

The hopper 210 is generally configured to store the bulk material that is to be distributed across the ground surface. The hopper 210 defines a hopper volume 212 and a loading opening 214 through which bulk material is loaded into the hopper volume 212. The loading opening 214 is generally defined towards a top end 202 of the hopper 210, where the "top end" is the top end of the hopper 210 when the hopper 210 is in an operating position, or operating orientation, as shown in FIGS. 1-2, which will be described in more detail below. In some embodiments, such as where the hopper assembly 200 is consistent with a spreader device, the hopper 210 also defines a discharge opening 218 (FIG. 3) towards a bottom end 204 of the hopper 210 (when the hopper assembly 200 is in an operating position depicted in FIGS. 1-2) that is configured to allow the discharge of the bulk material stored in the hopper 210 under gravity. The hopper volume 212 generally extends between the top end 202 and the bottom end 204 of the hopper 210. In embodiments where a discharge opening 218 is defined by the hopper 210, the hopper volume 212 extends between the loading opening 214 and the discharge opening 218. The hopper assembly 200 can have a hopper cover 219 (FIG. 3) that is removably disposed across the loading opening 214. The hopper cover 219 is generally configured to contain bulk material in the hopper 210 and obstruct foreign materials from entering the hopper 210 through the loading opening 214.

In various embodiments the hopper 210 has at least one sidewall 216 that extends between the top end 202 and the bottom end 204 of the hopper 210 around the hopper volume 212. The at least one sidewall 216 generally tapers from top end 202 towards the bottom end 204. In the examples consistent with the currently described figures, the at least one sidewall 216 extends between the loading opening 214 and the discharge opening 218 around the hopper volume 212. The at least one sidewall 216 generally tapers from the loading opening 214 towards the discharge opening 218 to assist the bulk material in progressing towards the discharge opening 218 under the force of gravity.

Furthermore, in various embodiments, the hopper volume 212 is generally asymmetric. In various embodiments the hopper volume 212 has a center of gravity that is closer to a rear end 213 than a front end 211 of the hopper (FIG. 1). Such a configuration may advantageously improve the stability of the vehicle 100. In various embodiments, the hopper 210 has a front inclined sidewall 215 defining the front end of the hopper 210 and a rear inclined sidewall 217 defining the rear end 213 of the hopper 210. In various embodiments, the rear inclined sidewall 217 has a slope that is less than the opposite of the slope of the front inclined sidewall 215. For purposes of the present disclosure, the slope of the sidewalls is defined herein to be the average slope of the sidewall from the top end 202 (such as at the end defining the loading opening 214) to the bottom end 204 (such as the end defining the discharge opening 218).

In various embodiments the hopper assembly 200 is pivotably coupled to the vehicle frame 130 such that the hopper 210 and other components of the hopper assembly 200 are pivotable relative to the vehicle 100. The hopper assembly 200 has a coupling end 232 that is configured to pivotably couple to the vehicle frame 130. The hopper assembly 200 defines a hopper pivot axis Z (see FIGS. 1 and 3) about which the hopper 210 is configured to pivot relative to the vehicle frame 130. The hopper assembly 200 can be pivotably coupled to the vehicle frame 130 with the use of a bolt, hinge, or through other approaches known in the art. It is noted that in some embodiments, the hopper 210 of the hopper assembly 200 is directly pivotably coupled to the vehicle frame 130, meaning that the hopper 210 is coupled to the vehicle frame 130 without intervening components (except for a fastener that may couple to hopper 210 to the vehicle frame 130).

The hopper assembly 200 is generally configured to pivot between an operating position, which is the position in which the hopper assembly 200 is configured to operate (depicted in FIGS. 1 and 2), and a maintenance position (or maintenance orientation), which is the position in which the hopper assembly 200 is not configured to operate (depicted in FIG. 3). The maintenance position may facilitate various maintenance operations on the hopper assembly 200 and/or the vehicle 100. The operating position can be at least 45 degrees from the maintenance position. In some embodiments the operating position is at least 60 or 75 degrees from the maintenance position. In some embodiments the operating position is about 90 degrees from the maintenance position. The operating position can be greater than 90 degrees in further embodiments. In an example, the operating position is between 100 degrees and 120 degrees from the maintenance position.

In some embodiments, the hopper assembly 200 is configured to pivot outwardly from the rest of the vehicle 100. In the current example, the hopper pivot axis Z extends across the first end 101 (e.g., the front end) of the vehicle 100 (FIG. 1). As best visible in FIG. 3, the hopper pivot axis Z is positioned on the first end 101 of the vehicle frame 130 beyond the one or more caster wheels 102 in the longitudinal direction. The hopper assembly 200 is configured to pivot about the hopper pivot axis Z in a forward direction relative to the maintenance vehicle 100. The hopper pivot axis Z can extend laterally and can be parallel to the front end of the vehicle 100. In some other embodiments the pivot axis can extend parallel to a side of the vehicle 100. In such embodiments, the hopper assembly 200 can be configured to pivot outward from the side of the vehicle 100.

In some examples, the hopper assembly 200 has a hopper frame 230. The hopper frame 230 is generally configured to couple the hopper 210 and other components of the hopper assembly 200 to the vehicle frame 130. The hopper frame 230 is generally fixed to the hopper 210. In some examples including the one depicted, the hopper frame 230 is pivotably coupled to the vehicle frame 130 such that the hopper 210 and other components of the hopper assembly 200 are pivotable relative to the vehicle 100. The hopper frame 230 has a coupling end 232 that is configured to pivotably couple to the vehicle frame 130. The hopper frame 230 defines a hopper pivot axis Z about which the hopper frame 230 is configured to pivot relative to the vehicle frame 130. The hopper frame 230 can be pivotably coupled to the vehicle frame 130 with the use of a bolt, hinge, or through other approaches known in the art. It is noted that, in some embodiments, a hopper frame 230 can be omitted.

In various embodiments the hopper assembly 200 has a latching mechanism 224 (best visible in FIG. 3) that is configured to maintain the hopper assembly 200 in an operating position. In various embodiments the latching mechanism 224 releasably couples the hopper assembly 200 (such as the hopper 210 or the hopper frame 230) to the vehicle frame 130. The latching mechanism 224 can be manually released by a user to enable pivoting of the hopper assembly 200 to a maintenance position.

In some embodiments, the hopper assembly 200 can have one or more pivot limiting structures that at are configured to limit pivoting of the hopper 210 beyond the maintenance position. As examples, a strap, lanyard, or rod can be positioned to physically obstruct pivoting of the hopper 210 beyond the maintenance position. The pivot limiting structure accommodates pivoting of the hopper assembly 200 from the operating position to the maintenance position. In some embodiments, when the hopper assembly 200 is in the operating position or being pivoted towards the maintenance position, the pivot limiting structure is not under tension. However, in some such embodiments, when the hopper assembly 200 is pivoted to the maintenance position, the pivot limiting structure is put under tension that opposes the force of gravity (and other forces) on the hopper assembly 200 to prevent further pivoting of the hopper assembly 200 beyond the maintenance position. In some embodiments, a pivot limiting structure can have a first end coupled to the vehicle frame 130 and a second end coupled to the hopper assembly 200. In some other embodiments the pivot limiting structure can be entirely coupled to the vehicle frame 130. In such embodiments the pivot limiting structure can be disposed along the pivot pathway of the hopper assembly to abut the hopper assembly 200 when the hopper assembly 200 is pivoted to the maintenance position.

In the operating position, the hopper assembly 200 generally extends over the prime mover 170 of the vehicle (see FIGS. 1 and 2). In various embodiments, the hopper assembly 200 obstructs access to the prime mover 170 in the operating position. In the maintenance position, the hopper assembly 200 is pivoted away from the position extending over the prime mover 170, thereby exposing at least a top portion of the prime mover 170 (see FIG. 3). In particular, in the maintenance position, the hopper assembly 200 does not extend over the prime mover 170. Such a configuration may advantageously allow the prime mover 170 to be accessed by a user to engage in maintenance operations on the prime mover 170. Furthermore, in the operating position, the hopper assembly 200 is generally in an orientation to facilitate loading, storing, and transport of bulk material (and potentially distribution of bulk material) on a ground surface. In the maintenance position, the hopper assembly 200 is an in orientation that may facilitate cleaning or other maintenance operations on the hopper assembly 200. For example, in a maintenance position the hopper 210 can be pivoted such that the loading opening 214 and the hopper volume 212 faces outward from the front end 101 of the vehicle 100.

The hopper assembly 200 can have various additional components. For example, where the hopper assembly 200 is incorporated in a spreader device, the hopper assembly 200 can have components that enable the distribution of bulk material on a ground surface 50. For example, the hopper 210 can have a discharge opening 218 that is configured to release bulk material stored in the hopper 210. The spreader device can be consistent with a drop spreader or a broadcast spreader, as examples. When the spreader device is consistent with a broadcast spreader, a broadcasting component such as a spreader disk or belt is configured to receive the bulk material from the discharge opening 218 of the hopper 210 via gravity. The broadcasting component is further configured to apply a lateral force to the received bulk material to fling (or broadcast) the received bulk material outward from the hopper 210. Spreader devices consistent with a drop spreader can omit a broadcasting component such that the bulk material is configured to drop from the discharge opening 218 under the force of gravity. Both broadcast spreaders and drop spreaders can have intervening components to direct and regulate the flow of the bulk material from the discharge opening towards the ground surface such as a chute, platform, screen/lattice, and adjustment mechanisms (examples of which are discussed below).

Figure 6:
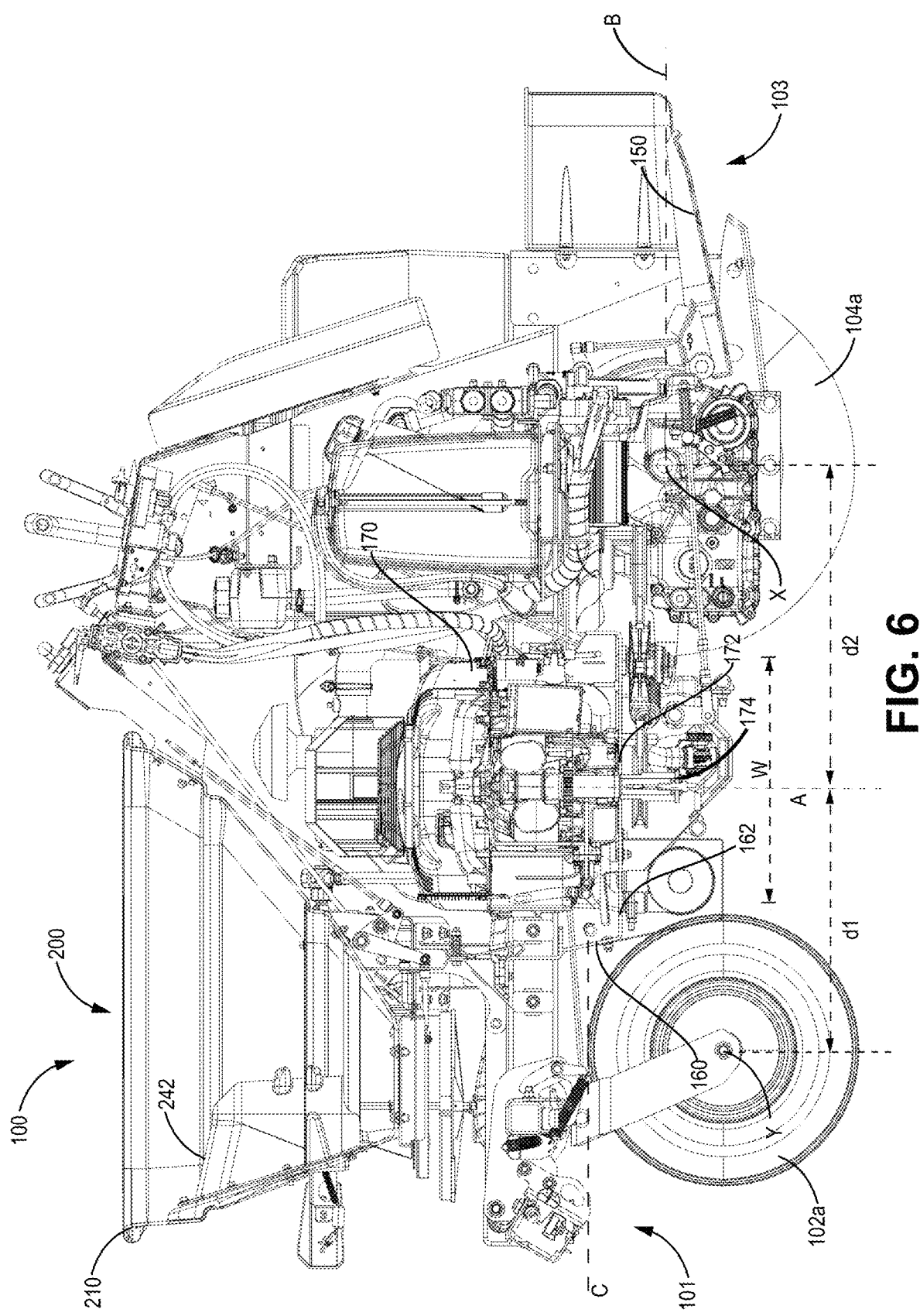
FIG. 6 is a cross-sectional view of a vehicle 100 that is generally consistent with the technology disclosed herein.

In the current example, the hopper assembly 200 is a component of a spreader device that has a spreader disk 240 positioned vertically below the discharge opening 218 when the hopper assembly 200 is in its operating position. The spreader disk 240 is coupled to a motor (not currently depicted) that is configured to spin the spreader disk 240 at a selected speed. In the current example the motor is coupled to the hopper 210 and more particularly is housed by the hopper 210 in motor housing 242 (visible in FIG. 6, where FIG. 6 is discussed in detail below). After the bulk material is discharged through the discharge opening under the force of gravity, the bulk material comes into contact with the spinning spreader disk 240, which launches the bulk material outward around the spreader disk 240 to eventually land on the ground surface 50.

The hopper assembly 200 can have a hopper controller 220. The hopper controller 220 is in operative communication with the hopper assembly 200. The hopper controller 220 is generally configured to allow a user to control operation of the hopper assembly 200. The hopper controller 220 can be fixed relative to the hopper 210. In the current example, the hopper controller 220 is fixed directly to the hopper 210. In some other embodiments where a hopper frame is employed, the hopper controller 220 can be directly fixed to the hopper frame 230. The hopper controller 220 is configured to be manually manipulated by a user for adjusting the hopper assembly 200, where "manual manipulation" is used to include interacting with an electrical and/or computer interface. In the current example, the hopper controller 220 has one or more adjustment mechanisms that are each configured to adjust a particular function of the hopper assembly 200. Each adjustment mechanism is part of a mechanical communication chain that is ultimately in operative communication with an adjustable component of the hopper assembly 200. The mechanical communication chain is defined to include both mechanically and electrically driven components.

For example, a first adjustment mechanism can be configured to adjust the size of the discharge opening 218 of the hopper 210. The first adjustment mechanism can be a manually engageable interface, such as a knob, handle, button, dial, touch screen, or the like. The size of the discharge opening 218 can define the rate of release of the bulk material stored in the hopper 210.

When the hopper assembly 200 is in an operating position, the hopper controller 220 is adjacent the control panel 140 of the vehicle 100 (see FIGS. 1 and 2). Such a configuration generally enables a user who has access to the control panel 140 to also have access to the hopper controller 220. In various embodiments, the hopper controller 220 abuts the control panel 140 when the hopper assembly 200 is in an operating position. In some embodiments the hopper controller 220 is fixed relative to the hopper 210 and the hopper controller 220 pivots with the hopper 210 about the hopper pivot axis Z. As such, when the hopper 210 is in a maintenance position, the hopper controller 220 is distant from the control panel 140 (relative to when the hopper 210 is in its operating position). In some other embodiments the hopper controller 220 is fixed relative to the control panel 140 and does not pivot with the hopper assembly 200.

In some embodiments, the position of the spreader disk 240 is fixed relative to the hopper 210 such that the spreader disk 240 pivots with the hopper 210. In some such embodiments, when the hopper assembly 200 is in its maintenance position, the spreader disk 240 can be positioned between the hopper 210 and the prime mover 170 in the longitudinal direction.

Maintenance vehicles incorporating hopper assemblies or other chambers to store bulk material may have a weight that varies significantly between a state where the vehicle is storing its capacity of bulk material ("capacity state") compared to a state where the vehicle has no stored bulk material ("empty state"). It may be desirable to limit shifting of the center of gravity of the vehicle between the capacity state and the empty state. In some embodiments, maintenance vehicles consistent with the technology disclosed herein have a relatively low center of gravity.

Figure 4:
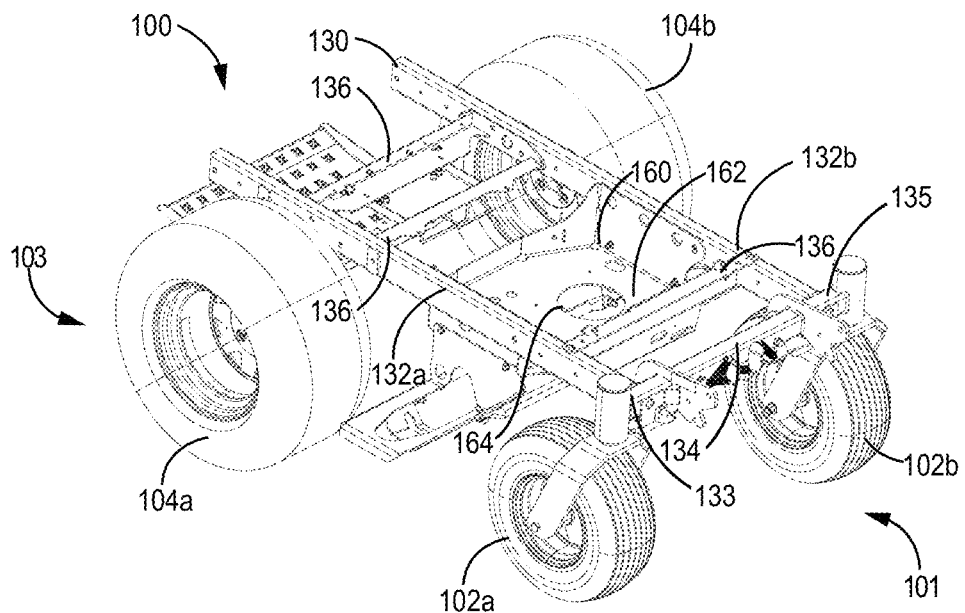
FIG. 4 is a simplified perspective view of some components of an example vehicle consistent with the present disclosure.

FIG. 4 is a perspective simplified view of an example vehicle 100 consistent with the technology disclosed herein. Various components depicted in the previous figures have been removed for clarity and the descriptions above are generally consistent with the presently depicted figure unless explicitly inconsistent with the current description. The vehicle 100 has a vehicle frame 130 having a first siderail 132a and the second siderail 132b. Each of the first siderail 132a and the second siderail 132b generally extend longitudinally between the first end 101 and the second end 103 of the frame 130. The first siderail 132a and the second siderail 132b are generally spaced apart in a lateral direction. The frame 130 has one or more crossbeams 136 that extend in the lateral direction and are fixed to the first siderail 132a and the second siderail 132b. The crossbeams 136 include a first crossbeam 134 that extends across the first end 101 of the vehicle frame 130. Drive wheels 104 and caster wheel(s) 102 are rotatably coupled to the frame 130. The drive wheels 104 have a drive wheel axis X and the caster wheels 102 each have a separate caster wheel axis or share a caster wheel axis Y.

The vehicle 100 has a mounting structure 160 fixed to the first siderail 132a and the second siderail 132b. The prime mover 170 is generally configured to be mounted to the mounting structure 160. In various embodiments, the mounting structure 160 is configured to receive the weight of the prime mover 170 and distribute the weight of the prime mover 170 across the vehicle frame 130 including the first siderail 132a and the second siderail 132b. The mounting structure 160 has a mounting surface 162 that is configured to particularly receive the prime mover 170. In various embodiments, the mounting surface 162 is a surface of the mounting structure 160 that is configured to receive a base of a prime mover 170. The mounting surface 162 is generally positioned laterally between the first siderail 132a and the second siderail 132b. The mounting surface 162 is generally positioned longitudinally between the first end 101 and the second end 103 of the vehicle frame 130.

Figure 5:
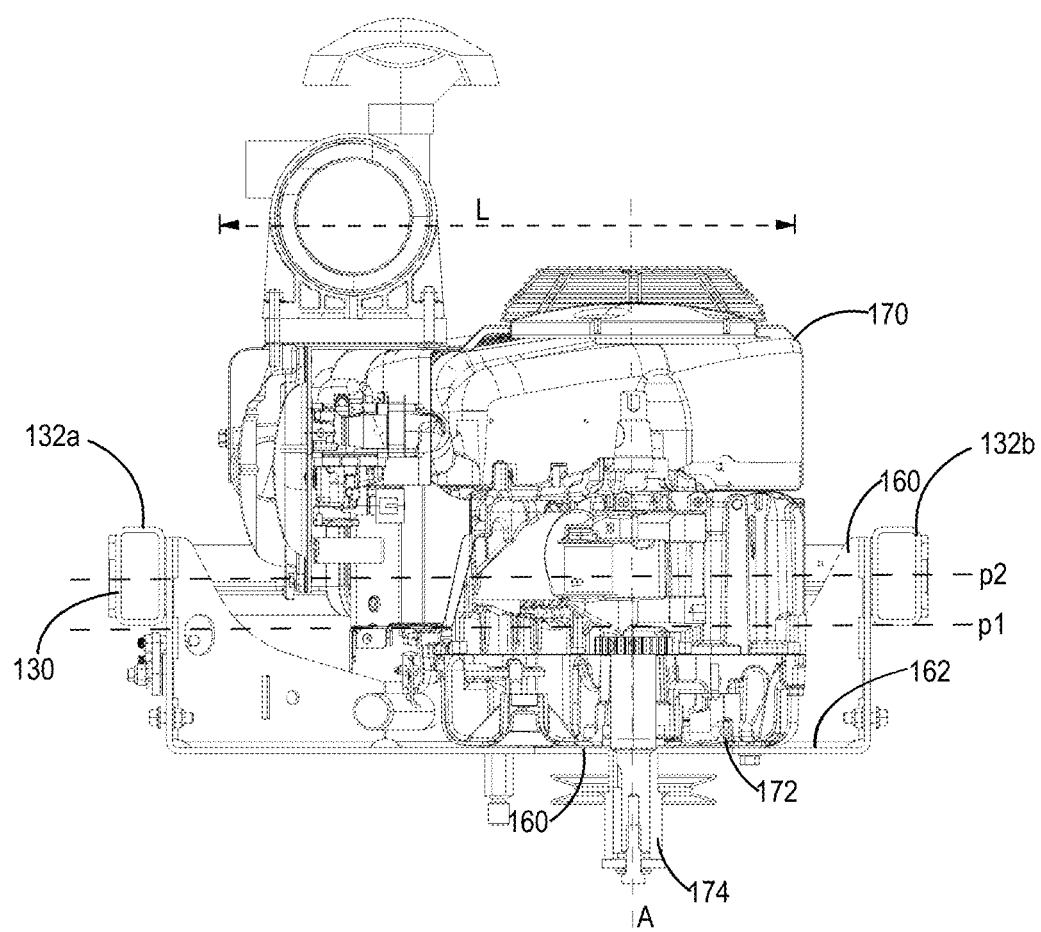
FIG. 5 is a cross-sectional view of a portion of an example vehicle represented in FIG. 3.

FIG. 5 is a cross-sectional view of the example vehicle frame 130 and the prime mover 170, where the cross section is taken through a vertical plane extending in the lateral direction, which is represented in FIG. 3. The present description can be considered in view of FIGS. 4 and 5. In the current example, the prime mover 170 has a base 172 that is configured to be contact with the mounting surface 162. In various embodiments the base 172 is fixed to the mounting surface 162 with fastening mechanisms generally known in the art. The mounting surface 162 is generally positioned vertically below the first siderail 132a and the second siderail 132b. The base 172 is generally positioned vertically below the first siderail 132a and the second siderail 132b. Such a configuration may advantageously lower the center of gravity of the vehicle 100. In some embodiments the mounting surface 162 is positioned vertically below an imaginary first siderail plane p1 and/or an imaginary second siderail plane p2 defined by the first siderail 132a and the second siderail 132b. The first siderail plane p1 is a plane defined by the bottom boundary of each of the siderails 132 and the second siderail plane p2 extends centrally through the vertical extension of each of the siderails 132. In various embodiments the mounting surface 162, and therefore the base 172, is positioned vertically below the second siderail plane p2. Such a configuration lowers the center of gravity of the vehicle 100 which may advantageously improve vehicle handling.

In various embodiments the mounting surface 162, and therefore the base 172, is positioned vertically below most of the length of each of the first siderail 132a and the second siderail 132b. In particular, in some embodiments a portion of the length of one or both of the first siderail 132a and the second siderail 132b may dip vertically below the mounting surface 162/base 172 such that the distance between the mounting surface 162/base 172 and a horizontal ground surface 50 (FIG. 3) is greater than the distance between the horizontal ground surface 50 and one or both of the first siderail 132a and the second siderail 132b along that portion of the length. However, in such embodiments, most of the length of each of the first siderail 132a and the second siderail 132b is positioned vertically above the mounting surface 162/base 172. In various embodiments, the mounting surface 162, and therefore the base 172, is positioned vertically below the length of each of the first siderail 132a and the second siderail 132b extending between the caster wheel(s) 102 and the drive wheels 104.

The distance between the base 172 (or mounting surface 162) and a horizontal ground surface 50 (FIG. 3) may be less than 16 inches in some embodiments. In some embodiments the distance between the base 172 (or mounting surface 162) and the horizontal ground surface 50 may be less than 15 inches in some embodiments. In some embodiments the distance between the base 172 (or mounting surface 162) and a horizontal ground surface 50 is greater than 8 inches, 9 inches, or 10 inches. In some embodiments the distance between the base 172 (or mounting surface 162) and a horizontal ground surface 50 ranges from 12 inches to 15 inches or 13 inches to 14 inches.

In various embodiments, the prime mover 170 is positioned transversely relative to the vehicle frame 130, meaning that the length L of the prime mover 170 extends in the lateral direction relative to the vehicle frame 130 and the width W of the prime mover 170 extends in the longitudinal direction relative to the vehicle frame 130. The length L is visible in FIG. 5, and the width W is visible in FIG. 6, which is a cross-sectional view of the example vehicle 100 through a vertical plane extending in the longitudinal direction through the driveshaft 174. The length L of the prime mover 170 is generally greater than the width W. By positioning the length L of the prime mover 170 in the lateral direction relative to the vehicle frame 130, the prime mover 170 takes up less space in the longitudinal direction, which allows the prime mover 170 to be positioned closer towards the first end 101 of the vehicle frame 130. Positioning the prime mover 170 closer towards the first end 101 of the vehicle frame 130 results in shifting the center of gravity of the vehicle 100 forward towards the hopper assembly 200. Such a configuration may advantageously reduce the change in the center of gravity of the vehicle 100 when the vehicle 100 fluctuates between an empty state and a capacity state, which may improve the consistency of handleability of the vehicle 100 between the empty state and the capacity state.

In various embodiments, the prime mover 170 has a vertical driveshaft 174 having a driveshaft axis A. The driveshaft 174 extends vertically downward from the base 172 of the prime mover 170. As such, the driveshaft 174 extends vertically downward from the mounting surface 162 of the mounting structure 160. The mounting surface 162 defines a driveshaft opening 164 that is configured to accommodate the driveshaft 174. The driveshaft 174 extends through the driveshaft opening 164. The driveshaft 174 is generally positioned centrally to the prime mover 170 relative to the width W (FIG. 6) of the prime mover 170. The driveshaft 174 is generally offset from a central position relative to the length L (FIG. 5) of the prime mover 170. As such, by positioning the prime mover 170 transversely relative to the vehicle frame 130, the driveshaft axis A is positioned closer to one siderail 132 (such as the second siderail 132b) than the other siderail 132 (such as the first siderail 132a) in the lateral direction. As such, the driveshaft opening 164 is positioned closer to one siderail 132 (such as the second siderail 132b) than the other siderail 132 (such as the first siderail 132a), which is visible in FIGS. 4 and 5.

In various embodiments, the prime mover 170 is positioned towards the first end 101 of the vehicle frame 130 relative to the second end 103 of the vehicle frame 130, as visible in FIG. 6. In some embodiments the driveshaft axis A can be positioned more closely to the first end 101 than the second end 103 of the vehicle frame 130 in the longitudinal direction. In some embodiments, the driveshaft axis A is positioned closer to the caster wheel axis Y than the drive wheel axis X in the longitudinal direction, which is represented by distances d1 and d2 in FIG. 6. As is visible in FIG. 6, in some embodiments, the base 172 of the prime mover 170 is positioned vertically below a plane C defined by a top end of one or more of the caster wheels 102.

As discussed above, the hopper assembly 200 can extend over the prime mover 170, which is visible in part in FIG. 6. More particularly, at least a portion of the hopper 210 is positioned vertically above the prime mover 170. In various embodiments the hopper 210 is asymmetric in the longitudinal direction such that the center of gravity of the hopper 210 is positioned closer to the prime mover 170 compared to a hopper having a symmetrical configuration in the longitudinal direction. Such a configuration may advantageously limit shifting of the center of gravity of the vehicle 100 when the vehicle 100 goes between an empty state and a capacity state.

In various embodiments the drive wheel axis X is positioned towards the second end 103 of the vehicle frame 130. In various embodiments the drive wheel axis X is positioned between the mounting surface 162 and the standing platform 150 in the longitudinal direction. In such embodiments the drive wheel axis X is positioned between the base 172 and the standing platform 150 in the longitudinal direction. The standing platform 150 is positioned towards the second end 103 beyond the drive wheel axis X in the longitudinal direction.

In various embodiments, in a deployed position, most of the standing platform 150 is configured to be positioned vertically below the drive wheel axis X, meaning that most of the surface area of the standing platform 150 is vertically below the drive wheel axis X. In some embodiments, when in a deployed position, the standing platform 150 is configured to be entirely positioned vertically below the drive wheel axis X. Such a configuration is represented by plane B in FIG. 6. In various embodiments, the drive wheel axis X is positioned between the mounting surface 162 (and therefore the base 172) and most of the standing platform 150 in the vertical direction.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A maintenance vehicle comprising:
a vehicle frame having a first end and a second end, the vehicle frame comprising a first siderail, a second siderail spaced laterally from the first siderail, wherein the first siderail and the second siderail each extend longitudinally from the first end to the second end;
a caster wheel rotatably coupled to the vehicle frame towards the first end, the caster wheel defining a caster wheel axis extending in a lateral direction;
drive wheels rotatably coupled to the vehicle frame towards the second end, the drive wheels defining a drive wheel axis; and
a prime mover coupled to the vehicle frame, the prime mover comprising a base and a vertical driveshaft extending from the base, wherein the vertical driveshaft is in operative communication with the drive wheels, the vertical driveshaft has a driveshaft axis closer to the second siderail than the first siderail in the lateral direction, and the driveshaft axis is closer to the caster wheel axis than the drive wheel axis in the longitudinal direction, and wherein the base is positioned vertically below most of the length of each of the first siderail and the second siderail.

2. The maintenance vehicle of claim 1, wherein the prime mover is an internal combustion engine.

3. The maintenance vehicle of claim 1, wherein the base of the prime mover is positioned vertically below a plane defined by a top end of the caster wheel.

4. The maintenance vehicle of claim 1, further comprising a standing platform coupled to the vehicle frame towards the second end, the standing platform adapted to support a standing operator.

5. The maintenance vehicle of claim 4, wherein most of the standing platform is positioned vertically below the drive wheel axis.

6. The maintenance vehicle of claim 4, wherein the standing platform is positioned beyond the drive wheel axis in the longitudinal direction.

7. The maintenance vehicle of claim 1, further comprising a hopper assembly comprising a hopper coupled to the vehicle frame towards the first end.

8. The maintenance vehicle of claim 7, wherein the hopper assembly is pivotably coupled to the vehicle frame, wherein the hopper assembly is pivotable about a hopper pivot axis between a maintenance position and an operating position.

9. The maintenance vehicle of claim 8, wherein the hopper pivot axis extends across the first end of the maintenance vehicle.

10. The maintenance vehicle of claim 8, wherein the hopper pivot axis is positioned beyond the caster wheel on the first end.

11. The maintenance vehicle of claim 7, wherein the hopper assembly is configured to pivot in a forward direction relative to the maintenance vehicle.

12. A maintenance vehicle comprising:
a vehicle frame having a first end and a second end, the vehicle frame comprising a first siderail, a second siderail spaced laterally from the first siderail, wherein the first siderail and second siderail each extend longitudinally from the first end to the second end;
a mounting structure fixed to the first siderail and the second siderail, wherein the mounting structure has a mounting surface positioned laterally between and vertically below most of the length of each of the first and second siderails, wherein the mounting surface is positioned longitudinally between the first end and second end, and the mounting surface defines a driveshaft opening that is positioned closer to the second siderail than the first siderail in a lateral direction;
drive wheels rotatably coupled to the vehicle frame towards the second end, the drive wheels defining a drive wheel axis extending in the lateral direction;
a prime mover mounted to the mounting structure, wherein the prime mover comprises a base in contact with the mounting surface and the prime mover comprises a vertical driveshaft extending through the driveshaft opening, wherein the vertical driveshaft is in operative communication with the drive wheels and has a driveshaft axis; and
a standing platform coupled to the vehicle frame towards the second end, the standing platform adapted to support a standing operator, wherein the standing platform is positioned beyond the drive wheel axis in the longitudinal direction.

13. The maintenance vehicle of claim 12, wherein most of the standing platform is positioned vertically below the drive wheel axis.

14. The maintenance vehicle of claim 12, further comprising a caster wheel rotatably coupled to the vehicle frame towards the first end, wherein the caster wheel defines a caster wheel axis.

15. The maintenance vehicle of claim 14, wherein the driveshaft axis is closer to the caster wheel axis than the drive wheel axis in the longitudinal direction.

16. The maintenance vehicle of claim 12, wherein the drive wheel axis is positioned between the mounting surface and most of the standing platform in both the vertical and longitudinal directions.

17. The maintenance vehicle of claim 12, wherein the prime mover is an internal combustion engine.

18. The maintenance vehicle of claim 12, further comprising a hopper assembly comprising a hopper coupled to the vehicle frame towards the first end.

19. The maintenance vehicle of claim 18, wherein the hopper assembly is pivotably coupled to the vehicle frame, wherein the hopper assembly is pivotable about a hopper pivot axis between a maintenance position and an operating position.

20. The maintenance vehicle of claim 14, further comprising a hopper assembly comprising a hopper pivotably coupled to the vehicle frame towards the first end, wherein the hopper assembly is pivotable about a hopper pivot axis extending across the first end of the maintenance vehicle, and wherein the hopper pivot axis is positioned beyond the caster wheel on the first end.

21. A maintenance vehicle comprising:
a vehicle frame having a first end and a second end, the vehicle frame comprising a first siderail, a second siderail spaced laterally from the first siderail,
a caster wheel rotatably coupled to the vehicle frame towards the first end, the caster wheel defining a caster wheel axis extending in a lateral direction;
drive wheels rotatably coupled to the vehicle frame towards the second end, the drive wheels defining a drive wheel axis;
a standing platform coupled to the vehicle frame towards the second end, the standing platform adapted to support a standing operator; and
a prime mover coupled to the vehicle frame, the prime mover comprising a vertical driveshaft having a driveshaft axis and a base positioned vertically below a plane defined by a top end of the caster wheel, wherein the drive wheel axis is positioned between the base and the standing platform in both a vertical direction and a longitudinal direction, and wherein the vertical driveshaft axis is closer to the caster wheel axis than the drive wheel axis in the longitudinal direction.

22. The maintenance vehicle of claim 21, wherein most of the platform is positioned vertically below the drive wheel axis.

23. The maintenance vehicle of claim 21, wherein the prime mover is an internal combustion engine.

24. The maintenance vehicle of claim 21, further comprising a hopper assembly comprising a hopper coupled to the vehicle frame towards the first end.

25. The maintenance vehicle of claim 24, wherein the hopper assembly is pivotably coupled to the vehicle frame, wherein the hopper assembly is pivotable about a hopper pivot axis between a maintenance position and an operating position.

26. The maintenance vehicle of claim 25, wherein the hopper pivot axis extends across the first end of the maintenance vehicle, and wherein the hopper pivot axis is positioned beyond the caster wheel on the first end.

27. The maintenance vehicle of claim 21, wherein the base is positioned vertically below most of the length of each of the first siderail and the second siderail.

* * * * *